Patented Jan. 25, 1949

2,459,779

UNITED STATES PATENT OFFICE 2,459,779

PERHALOTOLUENES

Waldo B. Ligett, Detroit, Mich., and Earl T. McBee, La Fayette, and Vincent V. Lindgren, West Lafayette, Ind., assignors to Purdue Research Foundation, West Lafayette, Ind., a corporation of Indiana No Drawing. Application November 13, 1945, Serial No. 628,378

5 Claims. (Cl. 260—651)

This invention relates to a novel group of aromatic halocarbons, specifically to perhalotoluenes, especially chlorofluorotoluenes having at least one fluorine atom attached to a ring carbon atom.

We have prepared representative members of this group of compounds and have determined certain of their physical constants whereby they may be identified. The compounds in general are colorless liquids, which boil somewhat above 100 degrees Centigrade at atmospheric pressure, depending upon the number of chlorine atoms substituted therein. These halocarbons are also generally water-immiscible, but they are readily soluble in other fluorochloro compounds and organic solvents such as alcohol and ether.

The compounds possess unusual stability, due to their aromatic structure and the presence of only carbon, chlorine and fluorine. In addition, the compounds have wide liquid ranges, due to their high molecular weights and the presence of at least one fluorine atom attached to a carbon atom in the ring. The perhalotoluenes, in view of the unique properties mentioned, as well as their non-flammable character, are especially applicable as dielectric and heat-transfer media, with a special application as electrical transformer fluids.

The compounds may be prepared by treating an appropriate halogenated cyclic compound, including aromatic chloro- or chlorofluorocarbons fluorinated in the side chain, with a fluorinating agent capable of saturating any double bonds, if present, in addition to replacing any hydrogen and some of the chlorine atoms in the compound. The reaction may be carried out, for example, in a stepwise manner, comprising successive treatments of the appropriate halogenated cyclic compound, first with bromine trifluoride and then with antimony pentafluoride. In this instance antimony pentafluoride is used to replace, with fluorine, any bromine which may enter the molecule during the fluorination with bromine trifluoride. The final product is subsequently dehalogenated and rectified to yield the desired perhalotoluenes. Silver difluoride may also be employed as a fluorinating agent, utilizing a brief contact period and a mild reaction temperature, the resulting product being dehalogenated and rectified.

The invention herein is not concerned with the process of manufacture or apparatus employed, but is concerned solely with the new group of compounds herein described and claimed. The example below illustrates one method by which members of this new group of compounds may be prepared, but is in no way to be construed as limiting the invention thereto.

Six hundred and forty-six grams of bromine trifluoride was placed in a nickel tube, 5.2 centimeters in diameter and 50 centimeters in length, closed at one end and cooled to zero degrees centigrade. Pentachlorobenzotrifluoride was added thereto in small quantities, with stirring by means of a nickel rod inserted through the top of the tube and fitted with four blades, two inches apart on the rod. After the first 100 grams and each of the following 200-gram quantities had been added, the reactor was heated to 90 degrees centigrade and then cooled to zero degrees centigrade. This prevented the accumulation and possible subsequent explosion and pyrolysis of unreacted starting material in the reactor. The mixture was then heated overnight at 150 degrees centigrade. The liquid product was cautiously washed with water to remove excess bromine trifluoride. The organic material was then neutralized with dilute alkali, washed with water and separated. A yield of 685 grams of a colorless liquid was obtained.

A second batch of 600 grams of pentachlorobenzotrifluoride was treated in a similar manner with bromine trifluoride. Eight hundred and one grams of bromine trifluoride was placed in a nickel tube and cooled to five degrees centigrade. Six hundred grams of pentachlorobenzotrifluoride was added thereto in small quantities, the rate of addition being, as usual, necessarily slow to prevent burning. The entire mixture was heated at 130 degrees centigrade for 36 hours. The product solidified in an ice bath, and was then washed at elevated temperatures with aqueous alkali and water, which were later removed by vacuum distillation.

The product from the above two reactions was combined in a three-neck flask fitted with stirrer, reflux condenser and dropping funnel. One and one-half moles of antimony pentafluoride was added thereto at a temperature of 90 degrees centigrade over a three-hour period. The mixture was then heated to 140 degrees centigrade and maintained at this temperature for a period of about eight hours, during which time 125 grams of bromine was distilled therefrom. The organic product, after being washed with concentrated hydrochloric acid, weighed 1018 grams, and was a mixture of average composition $C_6Cl_4F_7.CF_3$.

This halocarbon mixture was subjected to two treatments with zinc dust in ethanol. The first was with 535 grams of zinc dust suspended in 200 milliliters of ethanol at 90 degrees centigrade. The second was with 100 grams of zinc dust at 135 degrees centigrade. Five hundred sixty-nine grams of dehalogenated product was obtained and rectified in a four-foot, glass-packed column. The compounds which were separated from the reaction product included chlorotetrafluoro(trifluoromethyl)benzene, dichlorotrifluoro-(trifluoromethyl)benzene and trichlorodifluoro-(trifluoromethyl)benzene. These compounds are identified as follows:

| Compound | Boiling Point, °C. | Freezing Point, °C. | R. I. | Density (gm./ml.) |
| --- | --- | --- | --- | --- |
| $C_6ClF_4 \cdot CF_3$ | 135.8–136.0 at 740 mm. of Hg | below −70 | $1.4043^{30}$ | 1.700 at 24° C. |
| $C_6Cl_2F_3 \cdot CF_3$ | 170.5–170.7 at 742 mm. of Hg | −58 to −59 | $1.4445^{30}$ | 1.715 at 24° C. |
| $C_6Cl_3F_2 \cdot CF_3$ | 206.6–206.8 at 747 mm. of Hg | −26 to −27 | $1.4840^{25}$ | 1.721 at 25° C. |

Other members of this class of compounds within the scope of our invention which may be prepared by processes previously described include chlorotetrafluoro(chlorodifluoromethyl)-benzene, dichlorotrifluoro(dichlorofluoromethyl) benzene and other fluorine-containing perhalo derivatives of toluene containing at least one fluorine atom in the ring.

We claim:

1. A perhalo(trifluoromethyl)benzene containing chlorine and having at least one fluorine atom attached to the benzene ring.

2. A perhalotoluene containing chlorine and fluorine, wherein the acyclic carbon atom contains three substituent fluorine atoms and wherein at least one fluorine atom is attached to a carbon atom of the benzene ring, said compound having the general formula $C_6Cl_xF_{5-x}-CF_3$, wherein $x$ is an integer from 1 to 4, inclusive.

3. Chlorotetrafluoro (trifluoromethyl) benzene, $C_6ClF_4-CF_3$.

4. Dichlorotrifluoro (trifluoromethyl) benzene, $C_6Cl_2F_3-CF_3$.

5. Trichlorodifluoro (trifluoromethyl) benzene, $C_6Cl_3F_2-CF_3$.

WALDO B. LIGETT.
EARL T. McBEE.
VINCENT V. LINDGREN.

REFERENCES CITED

The following references are of record in the file of this patent:

UNITED STATES PATENTS

| Number | Name | Date |
| --- | --- | --- |
| 2,062,743 | Daudt et al. | Dec. 1, 1936 |
| 2,063,979 | Booth | Dec. 15, 1936 |
| 2,174,512 | Holt et al. | Oct. 3, 1939 |
| 2,174,513 | Holt et al. | Oct. 3, 1939 |
| 2,361,590 | Biggs | Oct. 31, 1944 |